United States Patent [19]

Skirvin et al.

[11] 4,268,051
[45] May 19, 1981

[54] LOG BUNK STRUCTURES

[75] Inventors: Paul G. Skirvin; Walter W. Skirvin; Carl L. Skirvin, all of Philomath, Oreg.

[73] Assignee: Enoch Skirvin & Sons, Inc., Philomath, Oreg.

[21] Appl. No.: 871,152

[22] Filed: Jan. 20, 1978

[51] Int. Cl.³ .............................................. B60P 7/12
[52] U.S. Cl. .................................... 280/145; 280/404
[58] Field of Search ............... 280/143, 144, 145, 146, 280/147, 148, 404, 438 R

[56] References Cited
U.S. PATENT DOCUMENTS 3,350,116 10/1967 Skirvin ................................. 280/145
3,356,387 12/1967 Skirvin ................................. 280/145

Primary Examiner—John A. Pekar
Attorney, Agent, or Firm—Klarquist, Sparkman, Campbell, Leigh, Hall & Whinston

[57] ABSTRACT

The specification discloses a roller insert which can be welded into a crossframe of a log trailer to provide low friction to a pivoted log bunk. Each insert includes a frame welded into a cutout portion in an end portion of the crossframe. Rollers are mounted on axles removably secured in the frame by keeper bars.

6 Claims, 5 Drawing Figures

U.S. Patent May 19, 1981 4,268,051
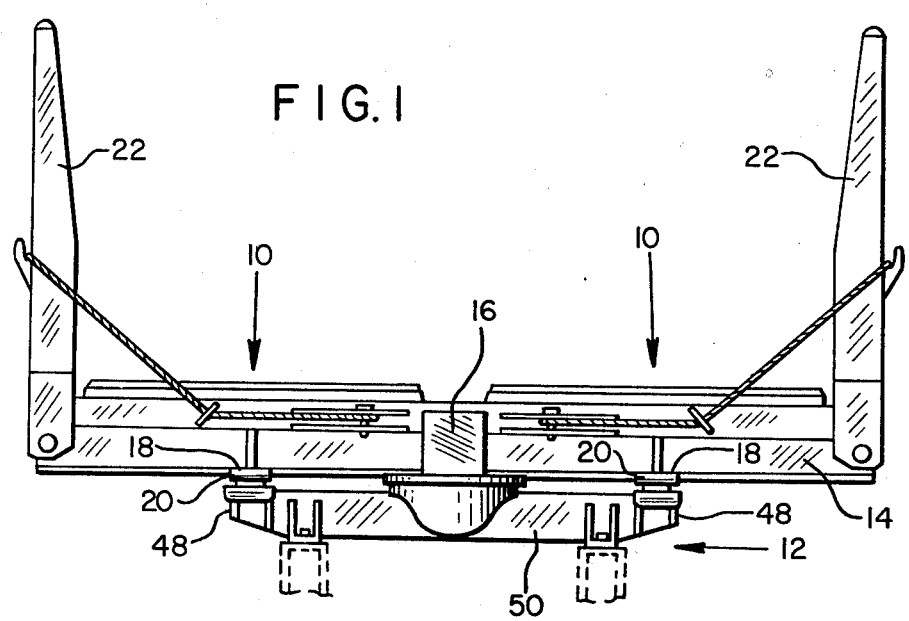
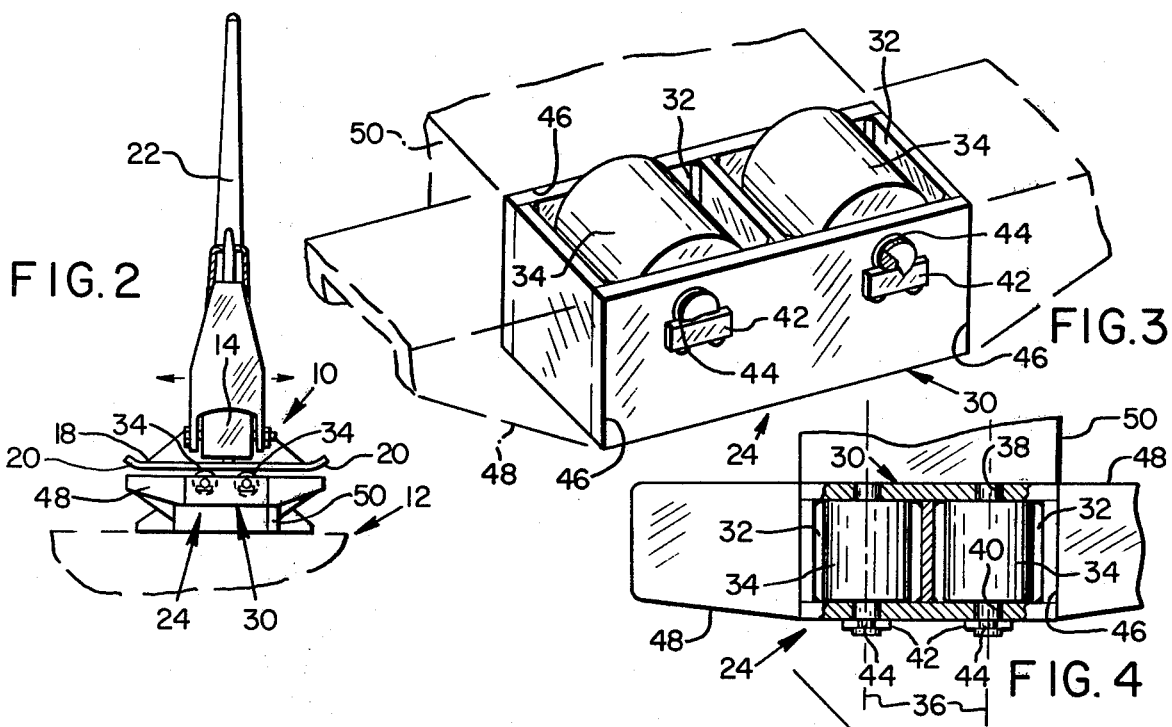
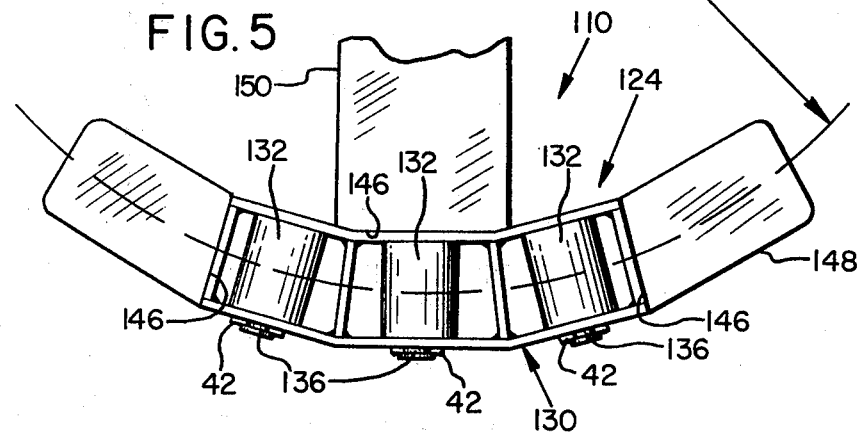

LOG BUNK STRUCTURES

DESCRIPTION

This invention relates to improved log bunk structures, and has for an object thereof the provision of new and improved log bunk structures.

Another object of the invention is to provide log bunk structures including roller inserts which can be installed in existing pivoted log bunk supports.

A further object of the invention is to provide log bunk structures including a roller insert having a box-like frame adapted to be welded into a cutout in an end portion of a log bunk support with rolls mounted on axles secured to the frame by keys welded to the frame.

In the drawings:

FIG. 1 is a fragmentary, vertical, sectional view of a log trailer having log bunk structures forming one embodiment of the invention;

FIG. 2 is a fragmentary, side elevation view of the log trailer of FIG. 1;

FIG. 3 is an enlarged perspective view of a roller insert of the log trailer of FIG. 1;

FIG. 4 is a fragmentary, top plan view of the log bunk structure of FIG. 1; and

FIG. 5 is a fragmentary, top plan view of a log trailer with a roller insert forming an alternate embodiment of the invention.

In FIGS. 1–4, a log bunk structure 10 of a log trailer 12 and forming a specific embodiment of the invention includes a log bunk 14 pivotal on a fifth wheel 16 and carrying at its ends guide shoes 18 having bevelled or upturned end portions 20. Stakes 22 are carried on the bunk to retain logs thereon. The shoes 18 are supported by roller inserts 24.

Each roller insert 24 includes a box-like frame 30 having two compartments 32, in which rollers 34 are positioned. The rollers are mounted on axles 36 which extend through the rollers and bores 38 and 40 in the frame 30. The axles are fixed to the frame by keying bars 42 extending into notches or grooves 44 in the axles and then are welded to the frame 30. The rollers project laterally above the frame 30. Each frame 30 is welded into a cutout portion 46 in an end bearing member 48 and an end portion of a crossframe member 50 integral with the end bearing member. The crossframe member forms part of the trailer frame 12 and is rigidly fixed thereto.

EMBODIMENT OF FIG. 5

A log bunk structure 110 forming an alternate embodiment of the invention is like the structure 10 except that an insert 124 has three rollers 132 and axles 136, the latter being on radii of the fifth wheel (not shown). A frame 130 has three compartments angularly disposed and welded into a cutout portion 146 in arcuate end bearing portion 148 and end portion of crossframe member 150.

What is claimed is:

1. In a trailer vehicle,
elongated supporting members extending longitudinally thereof and in the general direction of travel,
a crossframe including a crossframe member rigidly secured to the longitudinal members and a pair of bearing members,
the bearing members having cutout portions,
and a log bunk pivotal on the crossframe member and having guide shoes at the ends thereof,
and a pair of roller inserts at the ends of the crossframe member,
each roller insert including a box-like frame fitting into one of the cut-out portions and welded to the bearing members and an end of the crossframe member and also including a plurality of rollers.

2. The trailer vehicle of claim 1 wherein the box-like frame has a partition member compartmentizing it, and forming crosswise bracing.

3. The trailer vehicle of claim 2 wherein there are two rollers in the box-like frame.

4. The trailer vehicle of claim 3 wherein the rollers are substantially parallel to each other.

5. The trailer vehicle of claim 1 wherein there are three rollers substantially radial of the pivot of the bunk and including partition members forming bracing in the box-like frame.

6. In a trailer vehicle, elongated supporting frame means extending longitudinally thereof and in the general direction of travel, a crossframe including a crossframe member rigidly secured to the longitudinal frame means and a pair of bearing members, the bearing members having cutout portions, and a log bunk pivotal on the crossframe member and having guide shoes at the ends thereof, and a pair of roller inserts at the ends of the crossframe member, each roller insert including a box-like frame fitting into one of the cut-out portions and welded to the bearing members and an end of the crossframe member and also including a plurality of rollers.

* * * * *